United States Patent [19]

Platt et al.

[11] Patent Number: 4,865,867

[45] Date of Patent: Sep. 12, 1989

[54] LOW FAT SPREAD AND PROCESS FOR PREPARING SAME

[75] Inventors: Brian L. Platt, Cullompton; Bharat B. Gupta, Bath, both of England

[73] Assignee: St. Ivel Limited, London, England

[21] Appl. No.: 77,759

[22] Filed: Jul. 27, 1987

[30] Foreign Application Priority Data

Jul. 30, 1986 [GB] United Kingdom ............... 8618582

[51] Int. Cl.⁴ ............................................. A23D 5/00
[52] U.S. Cl. .................................. 426/603; 426/604; 426/804
[58] Field of Search ............... 426/602, 603, 604, 804

[56] References Cited

FOREIGN PATENT DOCUMENTS 1074176 3/1980 Canada ............................ 426/603
2150586 7/1985 United Kingdom ............. 426/603

*Primary Examiner*—Donald E. Czaja
*Assistant Examiner*—Celine Callahan
*Attorney, Agent, or Firm*—Limbach, Limbach & Sutton

[57] ABSTRACT

A low fat spread and process for preparing a low fat spread which is a water-in-oil emulsion comprising a continuous fat phase and a dispersed aqueous phase, the aqueous phase comprising at least 8% weight of one or more proteins derived from milk, and from 0.1 to 1.2% by weight of a modified starch, the fat phase constituting 18–35% by weight of the total weight of the low fat spread.

19 Claims, 1 Drawing Sheet

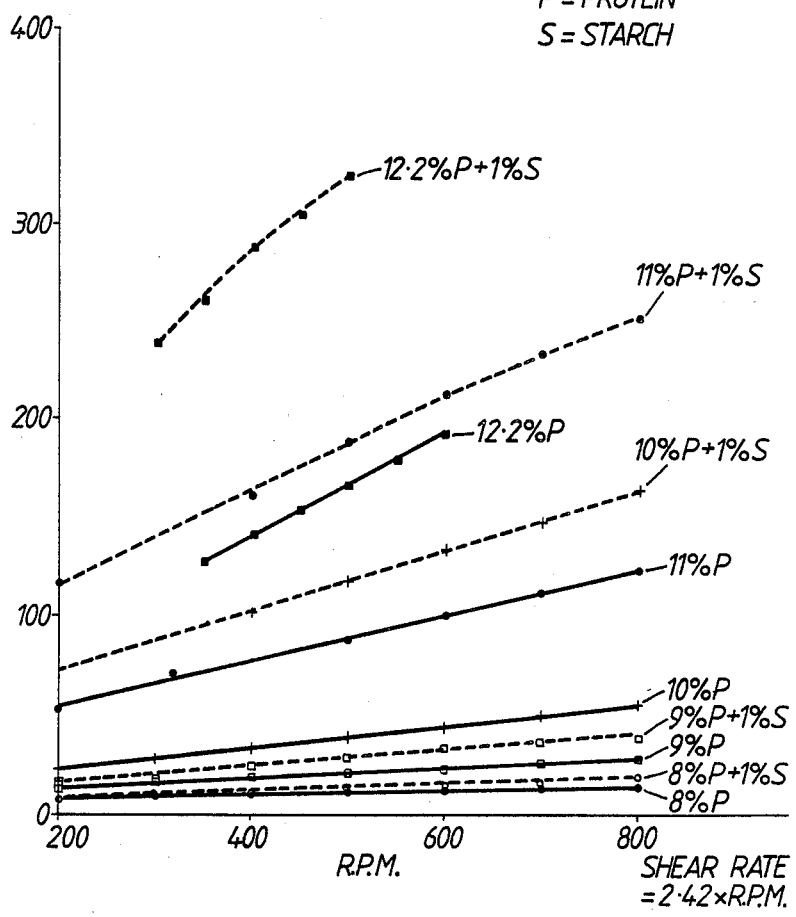

LOW FAT SPREAD AND PROCESS FOR PREPARING SAME

FIELD OF THE INVENTION

The present invention relates to low fat spreads.

DESCRIPTION OF THE PRIOR ART

Low fat spreads are usually emulsions of the water-in-oil type, and are often used as substitutes for butter and margarine. In view of the general public concern about the adverse effects on health which fat-containing foodstuffs are said to have, it has become increasingly desirable to produce butter-like products having as low a fat content as possible.

The main aim in producing such low fat spreads is to reduce the fat content of the butter-like products to as low a level as possible and to improve the spreadability, while retaining the butter-like flavour. Although butter-like products having reduced fat contents are commercially available, a problem arises if one attempts to reduce the amount of fat down to a level of 35% by weight or less. When the amount of the fat phase is reduced to a level below 35% by weight of the composition, the resultant emulsion becomes unstable and may undergo phase inversion.

The patent literature contains various proposals for making low fat blends of various formulations. Typical of such earlier proposals as those disclosed in for example, British Pat. Nos. 2150585 and 2150586, U.S. Pat. No. 4,536,408, and European patent application No. 52899.

However, none of these proposals provides for a low fat spread with a protein content in the aqueous phase as high as 8% by weight of the aqueous phase while incorporating low amounts of a fully dissolved modified starch in the aqueous phase.

Futhermore, as far as we are aware none of these earlier proposals has given rise to successful commercial products which are on the market.

SUMMARY OF THE INVENTION

We have now found that by incorporating a certain quantity of starch in a proteinaceous aqueous phase when forming the water-in-oil emulsion, the amount of fat phase in the composition can be reduced to 35% by weight or less, while avoiding the problem of phase inversion.

Accordingly, the present invention provides a low fat spread which is a water-in-oil emulsion comprising a continuous fat phase and a dispersed aqueous phase, the aqueous phase comprising at least 8% weight of one or more proteins derived from milk, and from 0.1 to 1.2% by weight of a modified starch, the fat phase constituting 18-35% by weight of the total weight of the low fat spread.

DETAILED DESCRIPTION

In preferred low fat spreads in accordance with the invention, the fat phase constitutes 23 to 29% by weight of the composition.

Preferably the amount of proteins in the aqueous phase is 10 to 13.5% by weight of the aqueous phase.

The starch in the aqueous phase is a modified starch, which is preferably in a pre-gelatinised form, typically a waxy maize starch or a potato starch or a tapioca starch, or a mixture thereof.

Examples of typical modified starches include white or yellow dextrin, roasted or dextrinated starch; acetylated distarch adipate; acetylated distarch phosphate; and hydroxypropyl distarch phosphate. Such modified starches and their preparation are described in "Proposal for a Council Directive on the Approximation of the Laws of the Member States Relating to Modified Starches Intended for Human Consumption, Offical Journal of the European Communities, Feb. 1, 1985 Vol. 28, C.31 1-6.

The proteins incorporated in the aqueous phase are proteins derived from milk, such as caseinates or a concentrated solution of milk protein. The preferred protein source is a solution of sodium caseinate, or a protein concentrate obtained from soured skimmed milk or buttermilk, or a mixture thereof. Preferably the amount of protein, for example caseinate or soured milk proteins, is 6.5-10% by weight of the total composition.

In addition the aqueous phase may incorporate conventional additives such as salts for flavouring, sorbate as a preservative, and citrates and phsophates which act as chelating agents to improve the stability of the resultant emulsions. The additives are added in varying amount, typically totalling 0.01 to 5% by weight of the composition; a person skilled in the art will readily be able to determine the optimum amounts of each additive.

The fat phase is preferably one having the following N.M.R. percent solids values at the stated temperatures:

| Temperature: | 10° C. | 20° C. | 30° C. | 35° C. | 40° C. |
|---|---|---|---|---|---|
| NMR % solids: | 70-25 | 40-15 | 30-5 | 20-0 | 0 |

Typical oil formulations having these characteristics are given in the Examples which follow.

According to a further aspect of the present invention, there is provided a process for preparing a low fat spread in accordance with the invention, which process comprises (i) forming a water-in-oil emulsion from a continuous fat phase and a dispersed aqueous phase, the aqueous phase comprising at least 8% of one or more proteins derived from milk, and from 0.1 to 1.2% by weight of a modified starch, with the fat phase constituting 18 to 35% by weight of the total weight of the low fat spread, (ii) pasteurising the resultant emulsion, (iii) cooling the emulsion to a temperature of 6° to 120° C., and (iv) processing the emulsion in a texturising unit at speed of at least 400 r.p.m.

In order to form the desired emulsion, the fat phase incorporates from 0.4 to 5% by weight of a conventional emulsifier such as a mono- or di-glyceride. The oil formulation which constitutes the fat phase is brought to a temperature of 40°-70° C. and introduced into an emulsification tank. The acidity of the aqueous phase is adjusted to a pH of 5.8 to 6.7 by adding a neutralising agent such as sodium hydroxide solution or lactic acid. The temperature of the aqueous phase is brought to 35°-65° C. and the appropriate amount of this phase is introduced into the emulsification tank where the two phases are vigorously agitated at a temperature of from 40°-75° C. to produce a stable water-in-oil emulsion. The emulsion is then pasteurised in conventional manner, cooled and worked to obtain a product having a butter-like taste and texture. The working of the emulsion is performed at high speed, typically at a speed in excess of 400 r.p.m.

We have found that low fat spreads in accordance with the invention, despite having a considerable reduction in fat content, are as acceptable to consumers as known products containing about 40% fat. Thus the products of the invention maintain the desired spreadability, mouth feel and butter-like flavour and body, while being low in fat content and low in calories.

A typical low fat spread in accordance with the invention has the following composition:

| | |
|---|---|
| Protein Solution (12.5% protein content) | 72.9% |
| Fats | 24.0% |
| Salts | 1.5% |
| Emulsifier | 0.7% |
| Modified Starch | 0.7% |
| Sorbate | 0.2% |

While not wishing to be bound by the following theoretical considerations, we believe that the increased stability of the water-in-oil emulsions of the invention is due to an increase in the viscosity of the aqueous phase. If the protein content of a proteinaceous aqueous phase is increased far enough, with concomitant increase in viscosity, then a stable emulsion can be formed at a fat content below 30%. However, the texture and body of such emulsions are very poor. We have found that certain combinations of starch and protein in the aqueous phase show a synergistic effect on viscosity. Thus, by incorporating starch into a proteinaceous aqueous phase the desired increase in viscosity is obtained, and an emulsion with satisfactory body and texture can be made.

The synergistic effect which can be obtained by ccombinations of starch and protein in the aqueous phase is shown for example, by the results plotted on the graph shown in the sole FIGURE of the accompanying drawings. The graph shows a plot of the Shear Rate vs Shear Stress for an aqueous phase containing various different amounts of protein with and without starch as measured by a Ferranti-Shirley Cone and Plate Viscometer at 50° C.

The aqueous phase was a mixture of sodium caseinate and protein concentrate obtained from soured skimmed milk, containing an equal amount of protein from each source. The starch used was Paselli BC ex-Tunnel AVEBE, which is a pre-gelatinised acetylated distarch phosphate derived from potato starch.

The results obtained and plotted on the graph show that, in an aqueous phase containing 10% or more protein, the addition of 1% of starch gives a greater increase in viscosity than the addition of 1% of protein, whereas in an aqueous phase containing 9% or less protein, the addition of 1% of starch gives a smaller increase in viscosity than the addition of 1% of protein. Thus, under the conditions of this example and using the type of starch specified, synergism is only apparent at a protein content of 10% or more. It should be noted that a 1% solution of the starch alone had negligible viscosity under the same conditions.

The present invention will now be illustrated by the following Examples.

EXAMPLE 1

| Composition of Fat Phase | |
|---|---|
| 1.92 kg Soyabean Oil | |
| 0.86 kg Palm Oil | |
| 0.43 kg Hydrogenated Soyabean Oil (m.p. 41° C.) | |
| 1.59 kg Hydrogenated Soyabean Oil (m.p. 38° C.) | |
| 0.14 kg Mono/Diglyceride Emulsifier | |
| 8 g Butter Flavour | |
| 1 g B-Carotene/Vitamins Mix | |
| Composition of Aqueous Phase | |
| 7.98 kg | Protein Concentrate obtained from Soured Skimmed Milk (12.9% Protein) |
| 1.04 kg Sodium Caseinate Powder | |
| 6.94 kg Whey | |
| 0.22 kg Sodium Chloride | |
| 0.13 kg Instant Pure-Flo Starch - | (a pre-gelatinised hydroxypropyl distarch phosphate, derived from waxy maize starch) |
| 55 g Potassium Sorbate | |
| 55 g Trisodium Citrate Dihydrate | |
| 50 g Disodium Hydrogen Phosphate Dihydrate | |

Preparation of the fat phase

The components of the fat phase were combined and heated to 70° C. and agitated in an emulsion tank.

Preparation of the aqueous phase

The sodium caseinate was dissolved in the whey and blended with the skimmed milk protein concentrate. This mixture was heated to 50° C. and all the remaining ingredients were added, with the exception of the starch. The pH of the aqueous phase was standardised to 6.4 with sodium hydroxide. The starch was added and the aqueous phase was then left to stand, with agitation, for 20 minutes. After standing, 15.06 kg of the aqueous phase was transferred from the aqueous phase tank to the emulsion tank containing the fat phase. Vigorous agitation was maintained within the emulsion tank throughout this process and the addition rate of the aqueous phase to the fat phase was controlled at less than 1000 ml min$^{-1}$. The resultant emulsion was of the water-in-oil type. This emulsion was pasteurised in conventional manner by heating to 84° C. and maintaining this temperature for 2 seconds. The product was then cooled to 10° C. and worked, at high speed (700 r.p.m.), in a Schroeder processor to obtain a product having butter-like taste and texture.

The product was found to be spreadable from the refrigerator and was physically stable at ambient temperature, it exhibited a shelf life equivalent to other low fat dairy spreads, had a butter-like taste and was considered superior to many low fat spreads of considerably higher fat levels. The fat content was 24.7%, and the calorie content was 265 kcals/100 g.

EXAMPLE 2

| Composition of Fat Phase |
|---|
| 0.96 kg Soyabean Oil |
| 2.64 kg Hydrogenated Soyabean Oil (m.p. 33° C.) |
| 1.20 kg Palm Oil |
| 0.10 kg Mono/Diglyceride Emulsifier |
| 1 g Colour + Vitamins |
| 2 g Flavouring |
| Composition of Aqueous Phase |

-continued

| | |
|---|---|
| 13.36 kg Whey | |
| 2.54 kg Sodium Caseinate Powder | |
| 0.22 kg Sodium Chloride | |
| 0.18 kg Snowflake 12615 Starch - | (a pre-gelatinised acetylated distarch phosphate, derived from waxy maize starch) |
| 55 g Potassium Sorbate | |
| 55 g Trisodium Citrate Dihydrate | |
| 50 g Disodium Hydrogen Phosphate Dihydrate | |

The process used to produce the low-fat spread was the same as that described in Example 1 except that the fat phase temperature was 50° C. and the aqueous phase temperature was 47° C.

Furthermore, the pH of the aqueous phase was adjusted to 6.0 and 15.05 kg of aqueous phase were added to the fat phase. The resultant emulsion was cooled as described in Example 1 and worked in a Schroeder processor at a speed of 460 r.p.m.

The properties of the product were as described in Example 1, except that the fat content was 24.5% and the calorie content was 270 kcals/100 g.

EXAMPLE 3

Composition of the Fat Phase:
2.45 kg Rapeseed Oil
3.15 kg Hydrogenated Soyabean Oil (m.p. 35° C.)
1.40 kg Palm Oil
0.10 kg Mono/Diglyceride Emulsifier
  1 g Colour + Vitamins
  2 g Flavouring
Composition of the Aqueous Phase
15.96 kg Protein Concentrate obtained from Soured Buttermilk (10.5% Protein)
0.22 kg Sodium Chloride
0.13 kg Instant Pure-Flo Starch - (as described in Example 1)
55 g Trisodium Citrate Dihydrate
55 g Potassium Sorbate
50 g Disodium Hydrogen Phosphate Dihydrate The process used to produce the low fat spread was the same as that described in Example 1, with the following exceptions:

(i) the pH of the aqueous phase was adjusted to 6.1, and (ii) 13.90 kg of aqueous phase were transferred to the emulsion tank containing the fat phase.

The properties of the product were as described in Example 1, except that the fat content was 33.8% and the calorie content was 335 kcals/100 g.

We claim:

1. A low fat spread which is a water-in-oil emulsion comprising a continuous fat phase and a dispersed aqueous phase, the aqueous phase comprising at least 8% weight of one or more proteins derived from milk, and from 0.1 to 1.2% by weight of a modified starch, the fat phase constituting 18–35% by weight of the total weight of the low fat spread.

2. A low fat spread according to claim 1, wherein the modified starch is selected from the group consisting of a waxy maize starch, potato starch, tapioca starch and mixtures thereof.

3. A low fat spread according to claim 1, wherein the starch is white or yellow dextrin, or roasted or dextrinated starch.

4. A low fat spread according to claim 1, wherein the starch is acetylated distarch adipate.

5. A low fat spread according to claim 1, wherein the starch is an acetylated distarch phosphate.

6. A low fat spread according to claim 1, wherein the starch is hydroxypropyl distarch phosphate.

7. A low fat spread according to claim 1, wherein the starch is in pre-gelatinised form.

8. A low spread according to claim 1, wherein the proteins are selected from the group consisting of caseinates, a concentrated solution of milk protein and mixtures thereof.

9. A low fat spread according to claim 8, wherein the protein is a member selected from the group consisting of a solution of sodium caseinate, a protein concentrate obtained from soured skimmed milk or buttermilk and mixtures thereof.

10. A low fat spread according to claim 8, wherein the amount of proteins is 10–13.5% by weight of the aqueous phase.

11. A low fat spread according to claim 1, wherein the fat phase is one having the following N.M.R. percent solids values at the stated temperature

| Temperature: | 10° C. | 20° C. | 30° C. | 35° C. | 40° C. |
|---|---|---|---|---|---|
| NMR % solids: | 70-25 | 40-15 | 30-5 | 20-0 | 0 |

12. A low fat spread according to claim 1, wherein the fat phase consitutes 23–29% by weight of the total weight of the low fat spread.

13. A low fat spread according to claim 1, wherein the low fat spread is one which has been prepared by working the water-in-oil emulsion at a speed in excess of 400 r.p.m.

14. A low fat spread according to claim 1, wherein the amount of modified starch is from 0.4 to 0.9% by weight of the aqueous phase.

15. A low fat spread according to claim 1, comprising:

| | |
|---|---|
| Protein Solution 12.5% protein content | 72.9% |
| Fats | 24.0% |
| Salts | 1.5% |
| Emulsifier | 0.7% |
| Modified Starch | 0.7% |
| Sorbate | 0.2% |

16. A process for preparing a low fat spread which is a water-in-oil emulsion comprising a continuous fat phase and a dispersed aqueous phase, the aqueous phase comprising at least 8% weight of one or more proteins derived from milk, and from 0.1 to 1.2% by weight of a modified starch, the fat phase constituting 18–35% by weight of the total weight of the low fat spread, said process comprising (i) forming a water-in-oil emulsion from a continuous fat phase and a dispersed aqueous phase, the aqueous phase comprising at least 8% of one or more proteins derived from milk, and from 0.1 to 1.2% by weight of a modified starch with the fat phase constituting 18 to 35% by weight of the total weight of the low fat spread, (ii) pasteurising the resultant emulsion;

(iii) cooling the emulsion to a temperature of 6° to 12° C., and (iv) processing the emulsion in a texturising unit at a speed of at least 400 r.p.m.

17. A process according to claim 16, wherein the emulsion is cooled to 10° C.

18. A process according to claim 16, wherein the emulsion is processed at a speed of 700 r.p.m.

19. A process according to claim 17, wherein the emulsion is processed at a speed of 700 r.p.m.

* * * * *